United States Patent [19]
Takahashi

[11] Patent Number: 6,055,019
[45] Date of Patent: Apr. 25, 2000

[54] CONVERTING APPARATUS

[75] Inventor: Shigeaki Takahashi, Kanagawa, Japan

[73] Assignee: Sony Corporation, Tokyo, Japan

[21] Appl. No.: 08/910,272

[22] Filed: Aug. 13, 1997

[30] Foreign Application Priority Data

Aug. 14, 1996 [JP] Japan ..................................... 8-214690

[51] Int. Cl.$^7$ .............................. H04N 7/01; H04N 11/20
[52] U.S. Cl. ............................................. 348/453; 348/642
[58] Field of Search .................................... 348/453, 454, 348/455, 456, 441, 642, 708, 712, 713; H04N 11/20, 7/01

[56] References Cited

U.S. PATENT DOCUMENTS

| | | | |
|---|---|---|---|
| 5,057,911 | 10/1991 | Stec et al. ................................. | 348/642 |
| 5,268,750 | 12/1993 | Stec et al. ................................. | 348/453 |
| 5,526,055 | 6/1996 | Zhang et al. ............................. | 348/510 |

*Primary Examiner*—Michael H. Lee
*Attorney, Agent, or Firm*—Jay H. Maioli

[57] ABSTRACT

A digital component signal derived from a video camera and the like is converted into a digital composite signal such as a color TV signal by a low-cost converting apparatus with a simple circuit arrangement. The converting apparatus includes an encoding circuit for encoding the inputted digital component signal to produce a digital component signal having a first sampling frequency equal to a sampling frequency of a luminance signal of the inputted digital component signal, an oversampling filter circuit for oversampling a digital composite signal outputted from the encoding circuit by a second sampling frequency higher than the first sampling frequency and thereafter for removing unnecessary high frequency components from the oversampled digital composite signal, and a rate converting circuit for rate-converting the second sampling frequency of the digital composite signal outputted from the oversampling filter circuit into a third sampling frequency different from the first sampling frequency.

4 Claims, 6 Drawing Sheets

FIG. 1

| PARAMETER | 525/60 | 625/50 |
|---|---|---|
| TOTAL PIXEL NUMBER/SCANNING LINE<br>LUMINANCE SIGNAL<br>COLOR DIFFERENCE SIGNAL | 858<br>429 | 864<br>432 |
| SAMPLED STRUCTURE | LATTICE SHAPE<br>COLOR SIGNAL SAMPLING POINTS ARE LOCATED AT SAME POSITIONS AS ODD-NUMBERED LUMINANCE SIGNAL SAMPLING POINTS, | |
| SAMPLING FREQUENCY<br>LUMINANCE SIGNAL<br>COLOR DIFFERENCE SIGNAL | 13.5MHz<br>6.75MHz | |
| EFFECTIVE PIXEL NUMBER/SCANNING LINE<br>LUMINANCE SIGNAL<br>COLOR DIFFERENCE SIGNAL | 720<br>360 | |
| QUANTIZING | 8 BITS, LINEAR QUANTIZING | |
| LEVEL ALLOCATION<br>LUMINANCE SIGNAL<br>COLOR DIFFERENCE SIGNAL | 235(WHITE)-16(BLACK)<br>128(MONOCHROMATIC COLOR)±112 | |

FIG. 2

| TOTAL PIXEL NUMBER/SCANNING LINE | 910 |
|---|---|
| SAMPLED STRUCTURE | LATTICE SHAPE |
| SAMPLING FREQUENCY | 4fcc(14.3MHz) |
| SAMPLING PHASE | I-AXIS, Q-AXIS |
| EFFECTIVE PIXEL NUMBER/SCANNING LINE | 768 |
| QUANTIZING | 8 BITS, LINEAR QUANTIZING |
| LEVEL ALLOCATION | 200(WHITE)-60(BLACK)<br>-4(SYNC) |

CONVERTING APPARATUS

BACKGROUND OF THE INVENTION

The present invention generally relates to a video coding/ converting apparatus. More specifically, the present invention is directed to a video coding/converting apparatus capable of converting a digital component signal into a digital composite signal.

In the case that video signals produced from a video camera, or a television camera are directly transmitted/ recorded as an R (red) signal, a G (green) signal, and a B (blue) signal, corresponding to three primary colors of light, or are transmitted/recorded as three baseband signals, these signals called as "component signals". Also, when these R, G, B signals are processed in a matrix to be transmitted/ recorded as baseband signals of a luminance signal Y and two color difference signals R-Y, B-Y, or when these R, G, B signals are transmitted/recorded as baseband signals of a luminance signal Y, an I signal, and a Q signal, these baseband signals are called "component signals".

In contrast thereto, when these R, G, B signals are combined (encoded) with a sync signal in accordance with a certain rule, the combined (encoded) signals are referred to as "composite signals". As this encoding system, there are proposed the NTSC system, the PAL system, and the SECAM system. In general, broadcast waves are transmitted in such a format of "composite signals".

When baseband signals such as luminance signals and color difference signals are digitally coded in the format of video signals, this digital coding is called "component coding". FIG. 1 indicates the contents of the component coding format rule recommended by CCIR (Comite' Consultatif International des Radiocommunication) in 1982.

In this format rule of FIG. 1, since the ratio of sampling frequencies with respect to the luminance signal and two types of the color difference signals are 4:2:2, this coding system is referred to as a "4-2-2 component system", which is comparable to the "2-1-1 system" in which the sampling frequencies thereof are half of the respective sampling frequencies. A digital VTR is called a "D1 machine", which is standardized by this 4-2-2 component system.

Also, as in the NTSC, PAL, SECAM systems, such signals as a luminance signal and color difference signals that have been frequency-multiplexed are coded. This coding is called "composite coding". As to this composite coding, SMPTE (Society of Motion Picture and Television Engineers) proposed in 1978 a coding rule proposal with respect to the NTSC system. FIG. 2 represents the contents of the composite coding format rule standardized by this proposal. A digital VTR is called a "D2 machine", which is standardized by this system.

As explained above, since there are electronic appliances belonging to the D1 machine series and electronic appliances belonging to the D2 machine series, digital component signals and digital composite signals are potentially required to be mutually convertible to each other. As apparent from the format rules of FIG. 1 and FIG. 2, since the sampling frequency of the digital composite signal is selected to be 14.318 MHz (=4 fsc, "fsc" being color sub-carrier frequency), whereas the sampling frequency of the luminance signal of the digital component signal is selected to be 13.5 MHz, the rate conversion of the sampling frequency is necessarily required when these signals are additionally and simply encoded/decoded.

FIG. 3 is a schematic block diagram for representing one example of the typical video coding/converting apparatus for converting the digital component signal into the digital composite signal.

In FIG. 3, reference numerals 101 and 102 indicate oversampling filters, reference numerals 103 and 104 represent rate converting circuits, and reference numeral 105 denotes an encoder circuit.

In this converting apparatus, when the digital component signal is converted into the digital composite signal, the luminance signal and the color difference signal are separately rate-converted by the rate converting circuits 103 and 104. Then, the rate-converted signals are synthesized with each other by the encoder circuit 105 and the synthesized signal is encoded, so that the digital composite signal may be produced.

However, in accordance with the above-described converting system of FIG. 3, two sets of the oversampling filters 101, 102 and two sets of the rate converting circuits 103, 104 are required with respect to these luminance and color difference signals. As a result, the entire circuit scale is increased, and the timing circuits are complex. This may cause a high-cost video coding/converting apparatus.

As previously described, in the video coding/converting apparatus for converting the digital component signal into the digital composite signal, as shown in FIG. 3, the rate converting circuits are required for the luminance signal and the color difference signal, respectively. Consequently, there are problems that this video coding/converting apparatus is made complex, large in circuit scale, and costly.

SUMMARY OF THE INVENTION

Therefore, an object of the present invention is to provide a converting apparatus capable of converting a digital component signal into a digital composite signal in a relatively simple processing manner with the employment of a small circuit scale.

To achieve the above-described object, a converting apparatus, according to the present invention, is comprised of: encoding means for encoding an inputted digital component signal to produce a digital component signal having a first sampling frequency equal to a sampling frequency of a luminance signal of the inputted digital component signal; oversampling filter means for over-sampling a digital composite signal outputted from the encoding means by a second sampling frequency higher than the first sampling frequency and thereafter for removing unnecessary high frequency components from the over-sampled digital composite signal; and rate converting means for rate-converting the second sampling frequency of a digital composite signal outputted from the oversampling filter means into a third sampling frequency different from the first sampling frequency.

BRIEF DESCRIPTION OF THE DRAWINGS

For a better understanding of the present invention, the detailed descriptions are to be read in conjunction with the accompanying drawings, in which:

FIG. 1 illustratively shows contents of component coding format rules;

FIG. 2 illustratively represents contents of composite coding format rules;

DETAILED DESCRIPTION OF THE PREFERRED EMBODIMENTS

Referring now the drawings, a video coding/converting apparatus according to the present invention will be described.

Figure 3:
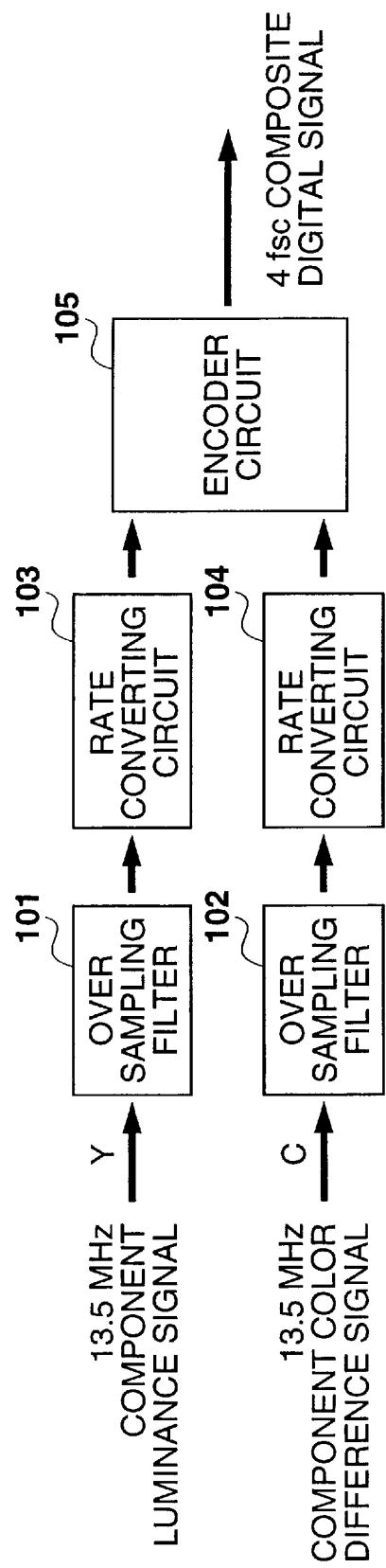
FIG. 3 is a schematic block diagram for indicating one example of the video coding/converting apparatus.
Figure 4:
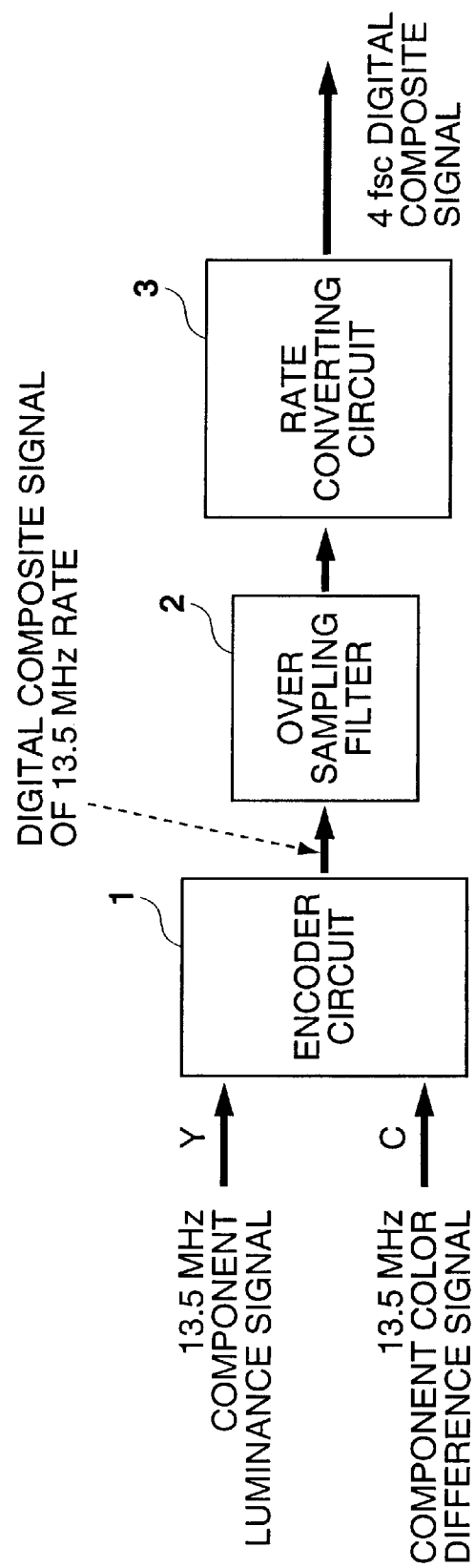
FIG. 4 is a schematic block diagram for representing a video coding/converting apparatus according to an embodiment of the present invention.

FIG. 4 is a schematic block diagram for indicating an arrangement of a video coding/converting apparatus according to an embodiment of the present invention.

In FIG. 4, reference numeral 1 shows an encoder circuit, reference numeral 2 denotes an oversampling filter, and reference numeral 3 represents a rate converting circuit.

As shown in this drawing, in the video coding/converting apparatus of this embodiment, a digital component signal constructed of a color carrier signal "C" and a luminance signal "Y" is inputted into the encoder circuit 1 so as to produce a digital composite signal, the sampling frequency of which is selected to be 13.5 MHz. Next, this digital composite signal is filtered by the oversampling filter 2 to be increased by a 27 MHz rate. Then, the oversampled digital composite signal is entered into the rate converting circuit 3, so that a digital composite signal with a 4 fsc rate is produced.

Figure 5:
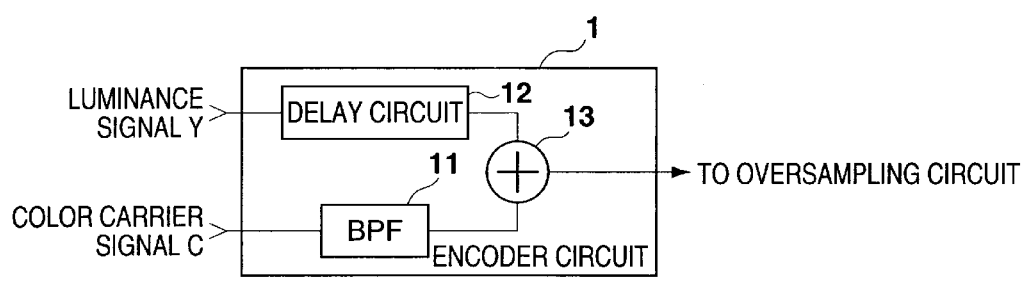
FIG. 5 is a schematic block diagram for showing a detailed arrangement of an encoder circuit employed in the video coding/converting apparatus of FIG. 4.

FIG. 5 is a detailed internal block diagram of one example of the encoder circuit 1. The color carrier signal C is entered into the encoder circuit 1, and thereafter the encoded color carrier signal is filtered by a BPF (bandpass filter) 11 capable of passing the color carrier signal band. On the other hand, the luminance signal Y is inputted into this encoder circuit 1, and thereafter, the encoded luminance signal is supplied to a delay circuit 12 having a delay time equivalent to the delays of the color carrier signal C. Thereafter, both the color carrier signal C processed by the BPF 11 and the luminance signal Y processed by the delay circuit 12 are supplied to an adder 13 so as to be added to each other. As a result, the digital composite signal, the sampling frequency Fs of which is 13.5 MHz, is produced.

Figure 6:
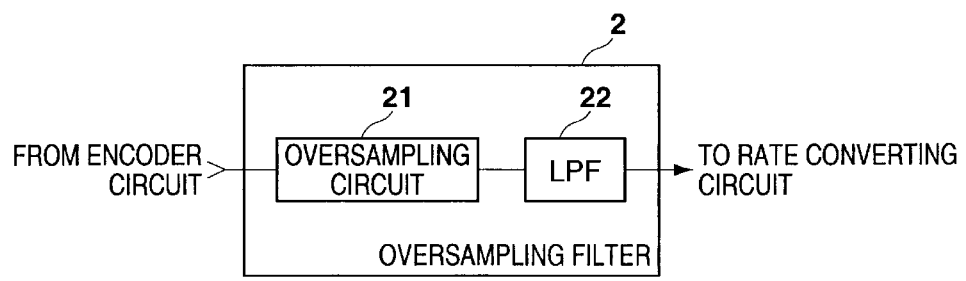
FIG. 6 is a schematic block diagram for representing a detailed arrangement of an oversampling filter employed in the video coding/converting apparatus of FIG. 4.

FIG. 6 is a detailed circuit block diagram of one example of the oversampling filter 2. In this case, the oversampling filter 2 is arranged by an oversampling circuit 21 and an LPF (lowpass filter) 22.

The digital composite signal whose sampling frequency "Fs" is selected to be 13.5 MHz, corresponding to the output signal derived from the encoder circuit 1, is entered into the oversampling circuit 21. Thus, the digital composite signal is over-sampled at a sampling frequency of 35 Fs (=35×13.5 MHz). This sampling frequency of 35 Fs is selected as the least common multiple of 13.5 MHz and 14.318 MHz, since a sampling frequency Fs' to be converted is 14.318 MHz and such a relationship can be established, i.e., 14.318:13.5= 35:33.

The output signal derived from this oversampling circuit 21 is supplied to the LPF (lowpass filter) 22, and then a baseband signal is derived from this LPF 22.

The output (baseband) signal derived from the oversampling filter 2 is entered into the rate converting circuit 3 so as to be resampled at another sampling frequency Fs' (14.318 MHz), so that this baseband signal of the LPF 22 is converted into a digital composite signal whose sampling frequency is 14.318 MHz.

As previously explained, in accordance with this embodiment, the digital component signal is first encoded to produce the digital composite signal having the same sampling frequency as that of that digital component signal. Thereafter, this sampling frequency of the digital composite signal is converted into another sampling frequency. As a consequence, it is possible to realize a video coding/converting apparatus capable of producing the digital composite signal with the 4 fsc rate by employing a minimum circuit arrangement.

It should be noted that in the above-described embodiment, the digital component signal constructed of the color carrier signal C and the luminance signal Y is entered into the video coding/converting apparatus. Alternatively, the color difference signals R-Y and B-Y may be inputted instead of the color carrier signal. In this alternative case, the color difference signals R-Y and B-Y are converted into the color carrier signal C by a chroma-signal processing method. A detailed operation of this chroma-signal processing method will be explained later. Also, a similar signal process operation may be realized in the case that a digital component signal constructed of a R signal, a G signal, and a B signal is entered into the video coding/converting apparatus.

Figure 7:
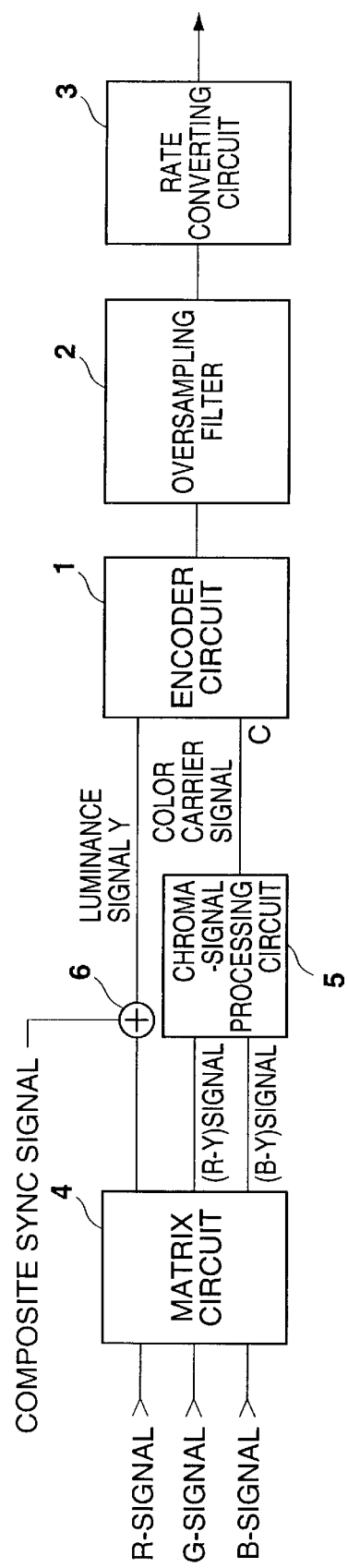
FIG. 7 is a schematic block diagram for indicating a video coding/converting apparatus according to another embodiment of the present invention.

FIG. 7 is a schematic block diagram for representing a video coding/converting apparatus according to another embodiment of the present invention, into which a digital component signal constructed of R, G, B signals is inputted.

In FIG. 7, reference numeral 4 shows a matrix circuit, reference numeral 5 is a chroma-signal processing circuit, reference numeral 6 represents a sync signal adding adder. It should also be noted that an encoder circuit 1, an oversampling filter 2, and a rate converting circuit 3 shown in FIG. 7 correspond to the relevant circuit elements operable in a similar manner shown in FIG. 1.

Figure 8:
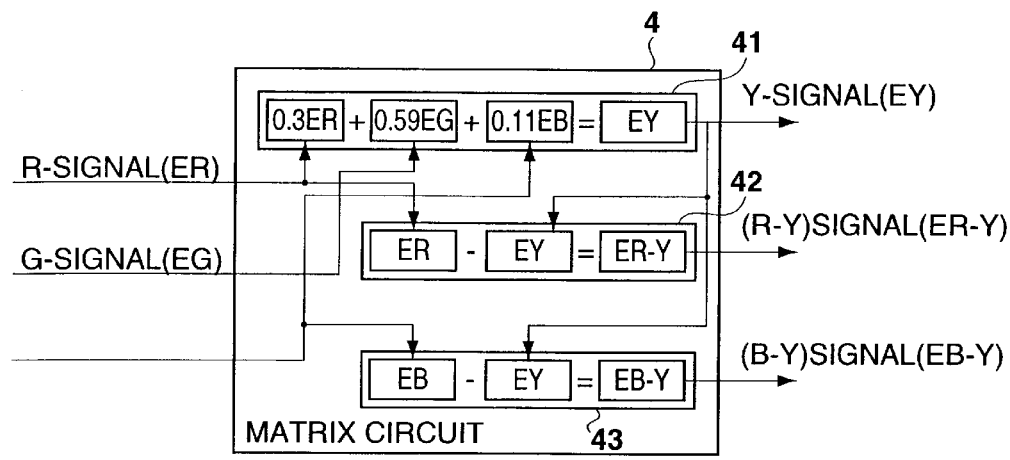
FIG. 8 is a functional block diagram for showing a matrix circuit employed in the video coding/converting apparatus of FIG. 7.

FIG. 8 is a functional block diagram of the matrix circuit 4. In FIG. 8, reference numeral 41 is a first calculating circuit, reference numeral 42 is a second calculating circuit, and reference numeral 43 shows a third calculating circuit. In this matrix circuit 4, the R, G, B signals are synthesized with each other as follows:

In the first calculating circuit 41, EY=0.3ER+0.59EG+ 0.11EB

In the second calculating circuit 42, ER-Y=ER-EY

In the third calculating circuit 43, EB-Y=EB-EY, where symbol EY indicates the level of the Y signal, symbol ER denotes the level of the R signal, symbol EB shows the level of the B signal, symbol ER-Y represents the level of the color difference signal R-Y, and symbol EB-Y is the level of the color difference signal B-Y. In this case, the ratios of ER, EG, EB with respect to EY (level of Y signal) are determined based upon color sensitivity (spectral luminous efficiency) of human eyes.

Figure 9:
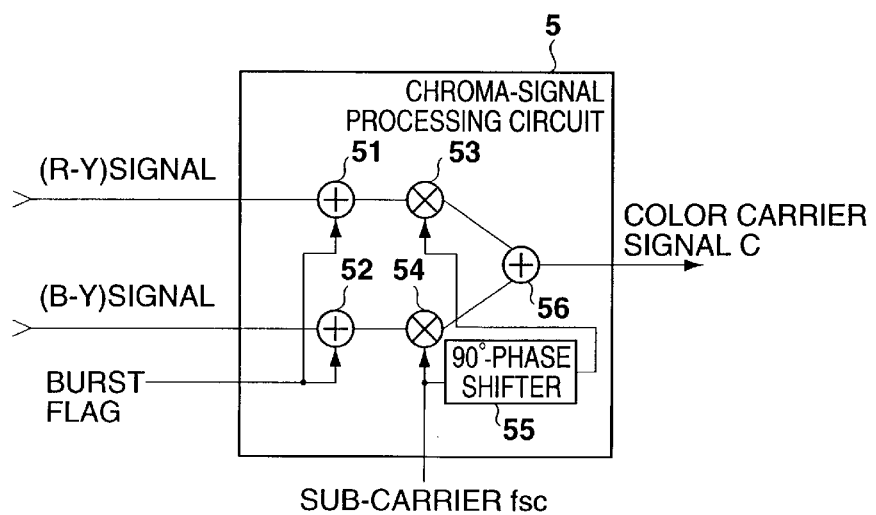
FIG. 9 is a schematic block diagram for showing a detailed arrangement of a chroma signal processing circuit employed in the video coding/converting apparatus of FIG. 7.

FIG. 9 is a detailed internal circuit block of the chroma-signal processing circuit 5.

In FIG. 9, reference numerals 51, 52 show burst signal adders, reference numerals 53, 54 indicate calculators, reference numeral 55 represents a phase shifter, and reference numeral 56 denotes a signal adder.

In this chroma-signal processing circuit 5, the color difference signal R-Y and the color difference signal B-Y are modulated by a color sub-carrier frequency fsc. It should be understood that this color difference signal R-Y and the color difference signal B-Y are quadrature-modulated by phase-shifting the color sub-carrier frequency fsc by 90°. Furthermore, the burst signal is added in response to the burst flag timing, and then the color carrier signal C is synthesized by carrying out these signal process operations. The unwanted high (radio) frequency signals produced by the modulation are removed by a BPF (bandpass filter) 11 of the encoder circuit 1.

On the other hand, a composite sync signal is added to the Y-signal by the sync signal adding adder 6. A delay time is applied to the luminance signal Y by a delay circuit 12 of the encoder circuit 1, and this delay time is equivalent to such a delay time that has occurred in the color carrier signal C which has been modulated and filtered by the BPF (bandpass filter) 11.

Thus, the resultant color carrier signal C and luminance signal Y are processed by the BPF (bandpass filter) 11 and the delay circuit 12 employed in the encoder circuit 1. Thereafter, the processed color carrier signal C and luminance signal Y are supplied to the adder 13 so as to be added to each other. Finally, the added signal becomes a digital composite signal whose sampling frequency Fs is equal to 13.5 MHz. Subsequently, this digital composite signal is processed by the oversampling filter 2 and the rate converting circuit 3 in a similar manner to the above-explained embodiment of FIG. 4.

Alternatively, the color difference signals R-Y and B-Y are formed from the R, G, B signals. Furthermore, after an I signal and a Q signal have been formed in accordance with the following formula, the I signal and Q signal are synthesized with each other, so that the color carrier signal C may be produced:

$$E1=0.74(ER-EY)-0.27(EB-EY)$$

$$EQ=0.48(ER-EY)+0.41(EB-EY)$$

It is noted that the I signal indicates color components of the red/orange color series and blue/green color series, which can be easily sensed, and the Q signal represents color components of the yellow color series and purple color series, which can be difficult to sense. While the I signal is limited to the range of 1.5 MHz and the Q signal is limited to the range of 0.5 MHz so as to be fitted to eye characteristics, the limited I signal/Q signal are quadrature-modulated to thereby produce the color carrier signal C. Subsequently, a similar process operation is carried out as in the previous embodiment.

While employing the above-described method, it is possible to realize the video coding/converting apparatus capable of producing the digital composite signal with the 4 fsc rate from the digital component signal constructed of the R, G, B signals in a relatively simple signal processing operation with a relatively small-scaled circuit arrangement. As a consequence, the digital component output signal from the video camera and the like can be readily converted into the digital composite signal.

In accordance with the above-described embodiment, the converting apparatus for rate-converting the inputted digital component signal into the digital composite signal is featured by comprising: encoding means for encoding the inputted digital component signal to produce the digital component signal having the first sampling frequency equal to the sampling frequency of the luminance signal of the inputted digital component signal; oversampling filter means for over-sampling the digital composite signal outputted from the encoding means by the second sampling frequency higher than the first sampling frequency and thereafter for removing unnecessary high frequency components from the over-sampled digital composite signal; and rate converting means for rate-converting the second sampling frequency of the digital composite signal outputted from the oversampling filter means into the third sampling frequency different from the first sampling frequency.

Since the above-described circuit arrangement is employed in the converting apparatus, only one set of the oversampling filter as well as only one set of the rate converting circuit are needed, resulting in reductions of the circuit scale thereof. To the contrary, two sets of the oversampling filters and also of the rate converting circuits are required in the conventional converting apparatus. Moreover, since the timing of the process operation can be made relatively simple, the cost of the rate converting circuit for converting the digital component signal into the digital composite signal can be reduced and also the converting circuit can be made compact.

In addition, since the first sampling frequency is set to 13.5 MHz and the third sampling frequency is set to 14.318 MHz, it is possible to convert, for instance, the recorded content of the D1 machine, so that the converted content is recorded on the D2 machine with a low cost. This may achieve large benefits in the industrial utilizations.

Also, the inputted digital component signal corresponds to the luminance signal and the color difference signals. Therefore, for example, the recorded contents of the D1 machine where the luminance signal and the color carrier signal have been recorded as the component signals are converted. Then, the converted contents can be easily recorded on the D2 machine with a low cost. This may achieve large benefits in the industrial utilizations.

Also, the inputted digital component signal corresponds to the R, G, B signals. As a consequence, the digital component output signal of the video camera and the like, corresponding to the R, G, B signals, can be readily converted into the digital composite signal which may be easily processed with a low cost. This may achieve large merits in the industrial utilizations.

I claim:

1. A converting apparatus for rate-converting an input digital component signal into a digital composite signal, comprising:

encoding means for encoding said input digital component signal and producing a digital composite signal having a first sampling frequency equal to a sampling frequency of a luminance signal of said input digital component signal;

oversampling filter means for over-sampling said digital composite signal outputted from said encoding means by a second sampling frequency higher than said first sampling frequency and for removing a plurality of high frequency components from said over-sampled digital composite signal; and rate converting means for rate-converting the second sampling frequency of said digital composite signal outputted from said oversampling filter means into a third sampling frequency different from said first sampling frequency.

2. The converting apparatus as set forth in claim 1, wherein said first sampling frequency is 13.5 MHz, and said third sampling frequency is 14.318 MHz.

3. The converting apparatus as set forth in claim 1 or claim 2, wherein said input digital component signal corresponds to said luminance signal and a color difference signal.

4. The converting apparatus as set forth in claim 1 or claim 2, wherein said input digital component signal corresponds to R, G, B signals.

* * * * *